United States Patent Office 3,503,950
Patented Mar. 31, 1970

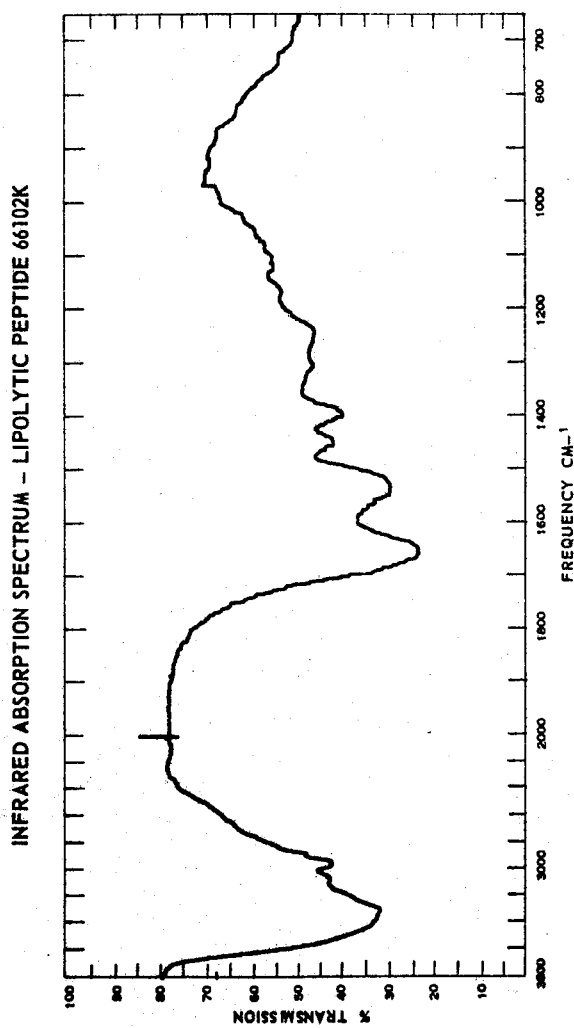

3,503,950
LIPOLYTIC PEPTIDE AND PROCESS
FOR PRODUCTION
Choh Hao Li, Berkeley, Calif., assignor to The Regents of the University of California, Berkeley, Calif., a corporation of California
Continuation-in-part of application Ser. No. 409,296, Nov. 5, 1964. This application June 25, 1968, Ser. No. 739,609
Int. Cl. C08h 1/00
U.S. Cl. 260—112
4 Claims

ABSTRACT OF THE DISCLOSURE

Mammalian pituitary gland, especially the anterior lobe, provides a source for an acidic lipolytic peptide identified by its amino acid composition, terminal amino acid content, related physico-chemical characteristics, and substantial freedom from ACTH activity.

The process comprises chromatographing an extract of the gland on carboxymethyl cellulose. Fractional elution to provide the peptide hormone of high lipolytic action in animal fat pads is achieved with ammonium acetate of varying molarity and pH.

CROSS REFERENCE TO RELATED APPLICATIONS

This application is a continuation-in-part of copending application Ser. No. 409,296, filed Nov. 5, 1964, now abandoned.

BRIEF SUMMARY OF THE INVENTION

This invention relates to the isolation of a new lipolytic peptide from natural sources such as mammalian pituitary gland, especially the anterior lobe thereof. This material comprises a complexity of biologically active proteins, peptides and the like which require exhaustive processing and elaborate procedures to separate one active material such as the present lipolytic peptide from other active substances; for example the posterior pituitary factors, ACTH, growth hormone, melanophore stimulating action, and the like. The isolation of the present lipolytic peptide provides an advance of importance to the chemist and the biologist both of whom seek the resolution of the complex naturally occurring biologically active hormones of the pituitary glands.

DETAILED DESCRIPTION

This invention relates to a novel and useful composition of matter and a process therefore, more particularly a novel and useful composition of matter of pituitary gland origin and a process for its production.

Mammalian pituitary gland, especially the anterior lobe thereof, is known to be a source of a large number of biologically active substances. The number of distinct factors secreted by the gland is a matter of conjecture, but several factors having highly specific biological activity have been prepared, for example, the growth factor, the follicle stimulating factor, the luteinizing factor, the crop gland stimulating factor, and the adrenocrticotropic factor known as ACTH. In addition to the above factors with rather specific biological action, other biologically active substances, extracts and preparations have been described; for example some preparations of ACTH have been shown to have fat mobilizing (adipokinetic) activity in fasted mice. (Recent Progress in Hormone Research XVIII, 1962, p. 7, Academic Press Inc., 111 5th Ave. New York, N.Y.)

Although biologically active factors from ammalian pituitary, especially the anterior lobe thereof, have been the subject of great interest and have received intensive investigation, discoveries of novel biologically active factors have been surprisingly few, and insofar as is known, there has not been provided heretofore the novel lipolytic peptide of the present invention having chemical, physical and biological properties which distinguish it from prior art factors of a biologically active nature.

The present invention provides from ammalian pituitaries a substantially homogeneous acidic peptide, free of pituitary tissue, characterized by lipolytic activity of high potency. Said peptide is neither a precursor nor a breakdown product of ACTH. Thus, the present invention provides a functional peptide in addition to a process for its preparation. Generally described, the process comprises preparing an acidified acetone extract of mammalian pituitaries, salting out an active fraction therefrom, dialyzing the active fraction in an aqueous medium, separating water from the dialyzed active fraction, and chromatographing the active fraction.

The starting material in the improved process is mammalian pituitary gland which means porcine, bovine and ovine gland. The whole gland or the anterior lobe thereof can be used in either fresh or frozen form. The preferred starting material is ovine whole pituitary, especially frozen whole pituitary from sheep.

The glandular material is minced and extracted with an acidified aqueous acetone solution. The insoluble residue is separated and re-extracted with more of such solution. The combined solubles are mixed with excess acetone to yield a precipitate, which is washed with acetone and dried in vacuo to a powder.

The dry powder is dissolved in water, and the pH of the aqueous solution is adjusted with a mineral acid. Saturated salt solution is added to form a first precipitate, which is separated and removed. The remaining soluble portion is brought to saturation with salt, the resultant precipitate is separated, dissolved in water and dialyzed against running purified water to remove salt. Water is volatilized from the dialyzed solution, preferably by freezing and drying in vacuo from the frozen state to a powder. A preliminary product is recovered for further processing.

The preliminary product is subjected to chromatography over carboxymethylcellulose previously equilibrated with ammonium acetate buffer. Gradient elution with respect to concentration and pH is carried out, utilizing ammonium acetate buffer. Fractions of eluate are collected and determinations of optical density to ultraviolet light are made. As various polypeptides and protein-like products are sequentially removed in consecutive fractional eluates the relative optical densities increase to peak values and decrease therefrom. Eluates with such increased and decreased densities, generally referred to as peaks, are combined, water and buffer are volatilized therefrom, and the respective products are recovered in dry solid form.

The gradient elution with respect to pH and buffer concentration is performed by preliminary elution with starting buffer followed by (1) a gradient formed by 0.1 M ammonium acetate of pH 6.7 introduced through a mixing flask containing the starting buffer and (2) a gradient increased by substituting 0.2 M ammonium acetate of pH 6.7 as the solution flowing into the mixing flask. The novel peptide and traces of chromatically similar peptides appear as a peak during elution with the gradient formed by the 0.2 M ammonium acetate of pH 6.7. The eluates corresponding to this peak are lyophilized to remove ammonium acetate and a dry solid material is obtained.

Rechromatography of this dry solid material on carboxymethylcellulose, prolonging the step which produced the gradient to 0.1 M ammonium acetate removes the traces of the chromatographically similar peptides, which are eluted prior to the main peak. Eluates corresponding to this main peak are frozen and dried from the frozen state to remove ammonium acetate, yielding a dry solid material consisting essentially of the novel peptide of the instant invention. This dry solid material is readily distinguished from ACTH by the two distinct chromatographic peaks of ACTH and the solid material obtained by chromatography of a mixture of both on carboxymethylcellulose.

The aforesaid dry solid material consisting essentially of the novel peptide can be further processed by exclusion chromatography on a cross-linked dextran gel having a water regain value of about 5 gm. per gm. (Sephadex G–50, AB Pharmacia, Uppsala, Sweden). Such further processing yields the novel peptide in substantially homogeneous form as shown by discriminating procedures such as disk electrophoresis in polyacrylamide gel, zone electrophoresis on starch, counter-current distribution in a solvent system of secondary butanol and 0.1% trichloroacetic acid (1:1 by volume) and ultracentrifugational analyses.

Amino acid analyses, end-group analyses and biological tests to determine lipolytic potency, melanocyte-stimulating potency and adrenocorticotropic potency serve to distinguish the presently obtained peptide from substances and factors heretofore described in the prior art.

How to perform the improved process to obtain the novel biologically active peptide and the best mode contemplated of carrying out the invention are set forth hereinafter, but such are not to be construed as limiting.

Frozen whole pituitary glads of sheep are minced and extracted with acidified aqueous acetone; 1 part by weight of glands to 4 parts by volume of extracting solution. The latter solution is prepared by mixing purified water, acetone, and concentrated hydrochloric acid (5:40:1, by volume). The extraction mixture is stirred during about one hour, filtered to separate insoluble and soluble portions. The insoluble portion is re-extracted with 2000 mls. of 80% acetone-20% purified water. The insoluble material is removed. The soluble extracts are combined and poured into 30 liters of acetone (about 4° C.). A precipitate is obtained. It is washed with excess acetone, recovered, and dried in vacuo at room temperature. About 35 gms. of dry powder are obtained per kg. of gland.

Approximately 20 gms. of such dry powder is dissolved in 940 mls. of purified water and the solution is adjusted with a mineral acid to pH about 3. Sixty milliliters of saturated aqueous sodium chloride solution is added to salt out a first precipitate, which is separated. The soluble portion is brought to saturation with sodium chloride. A second salted-out precipitate is separated, recovered and dissolved in about 100 mls. of purified water. The solution is dialyzed in cellophane tubing (20/100, Visking) against running purified water until salt free. Thereafter the dialyzed solution is frozen and dried in vacuum from the frozen state. The yield of preliminary product is about 4 gms.

1.8 gm. of said preliminary product was applied to a carboxymethylcellulose column (60 cm. x 1 cm.) previously equilibrated with 0.01 M ammonium acetate buffer of pH 4.6. Elution was started with buffer of the same molarity and pH. At a flow rate of about 100 mls. per hour, four hold-up volumes of eluate were collected. Thereafter, a continuous linear gradient to ammonium acetate of 0.1 M and pH 6.7 was started. Eluate fractions of 4 ml. were collected. After several peaks had been eluted, absorbancy began to return to the base-line value. At this time a continuous linear gradient to ammonium acetate of 0.2 M and pH 6.7 was started. Eluate fractions of 4 ml. were again collected. The next peak is at about tube 160. The eluates corresponding to this peak were combined, frozen and freed of buffer and water by drying in vacuo from the frozen state. About 115 mg. of dry powder was obtained.

The dry solid material corresponding to the peak at about tube 160 was submitted to further chromatography on carboxymethylcellulose, prolonging the step which produced the gradient to 0.1 M ammonium acetate of pH 6.7. This slightly different procedure introduced a less steep gradient, enabling the removal of traces of chromatographically-similar peptides. Eluates corresponding to the peak at about tube 160 were freed of water and buffer by lyophilization to yield 85 mg. of dry solid material consisting essentially of the peptide of the present invention. A sample of this material retained its chromatographic identity on carboxymethylcellulose, as shown by chromatographic resolution of a mixture of a 1 mg. sample and 3 mg. of sheep ACTH on CMC. The carboxymethylcellulose column was 10 cm. x 0.8 cm. prepared as above stated with 0.01 M, pH 4.6 ammonium acetate buffer and a gradient to 0.2 M of pH 6.7 was introduced through a 125 ml. mixing flask; flow rate 100 ml./hr., 1.8 ml. eluate per tube. An additional sample of this material migrated as a main well-defined band during disc electrophoresis in polyacrylamide gel; pH 4.5 ($\alpha$-alanine acetate buffer, 0.35 M), 30 minutes at 220 volts with a current of 12 milliamperes per tube (7 cm. x 0.5 cm.), "amidoblack" stain.

Eighty-five milligrams of the aforesaid dry solid material was dissolved in 2 ml. of 0.1 M acetic acid and applied to a column of cross-linked dextran gel having a water regain value of about 5 gm. per gm. (Sephadex G–50, AB Pharmacia, Uppsala, Sweden). The column dimensions were 230 cm. x 0.9 cm. and exclusion chromatography was carried out according to the procedure of Porath and Flodin, Nature, 183, 1657 (1959). Elution was carried out with 0.1 M acetic acid and 2-ml. fractions of eluate were collected. The tubes corresponding to the main peak, namely tubes 48 to 62, were pooled and lyophilized. The yield of novel peptide in dry powder form was 68 mg.

A sample of the novel peptide migrated as a single component during disc electrophoresis in polyacrylamide gel using the aforesaid conditions. Migration is at a slower rate than that for ACTH, indicating the more acidic nature of the novel peptide.

The novel peptide is not dialyzable through cellophane tubing (20/100, Visking) against dilute ammonium hydroxide solution. By elemental analysis the novel peptide is found to contain about 47.08 percent carbon and 7.55 percent hydrogen.

Zone electrophoresis of the novel peptide was carried out on a starch trough for 30 hours in 0.1 M sodium carbonate with a potential gradient of 5 volts/cm. at 5° C. The starch in the trough was cut into 1 cm. segments, each of which was eluted with 2 ml. of 0.1 M sodium carbonate. The peptide content in the eluate was analyzed by the Folin-Lowry reagent with aliquots of 0.5 ml. Lowry et al., J. Biol. Chem. 193, 265 (1951). The material migrates as a single zone and moves more slowly towards the anode than does ACTH.

A sample of the novel peptide was distributed for 120 transfers in an all-glass automatic countercurrent apparatus [Craid et al., J. Anal. Chem., 23, 1276 (1951)]. The solvent system was secondary butanol—0.1% trichloroacetic acid (1:1 by volume) and a 5 ml. volume of each solvent phase was used. The resulting distribution pattern, as determined from the optical density measurements at 280 m$\mu$, follows very closely the theoretical curve for a partition coefficient of $K=0.33$. This data is further support for the homogeneity of the novel peptide.

Ultracentrifugation experiments were performed with 0.5% solutions of the novel peptide using pH 1.3 in KCl—HCl buffer of 0.1 ionic strength in a Spinco Model E ultracentrifuge. A phase-plate Schlieren optical system was used for measurements of sedimentation coefficients. Ray light optics were used for sedimentation equilibrium studies; analysis of sedimentation equilibrium data is based on the equation of Svedberg and Pederson, The Ultracentrifuge, Oxford University Press, London and New York, 1940, pp. 8–9, as previously described, Squire et al., J. Biol. Chem., 238, 1389 (1963). The partial specific volume determined on the basis of its amino acid composition by the method of Cohn and Edsall, Proteins, Amino Acids and Peptides, Reinhold Pub. Corp., New York, N.Y., 1943, p. 375, was calculated to be 0.730. In these ultracentrifugation studies the material sedimented as a homogeneous substance with the sedimentation coefficient ($S_{20}W$) of 0.8 S. It is evident that the logarithm of concentration in terms of Raleigh fringes is a straight line function of the square of radial distance. From this slope, the molecular weight was computed to be 6,923. The calculated weight average molecular weight ($M_w$) was found to be 6,823. A molecular weight of about 7000 is indicated.

Amino acid analyses of the novel peptide, detailed in the table below, were carried out on hydrolysates in a sealed evacuated tube with 0.5 ml. of 5.7 N HCl at 110° C. for 22 and 72 hours respectively. The hydrolysates were analyzed according to Spackman et al., Anal. Chem., 30, 1190 (1958) in a Beckman amino acid analyzer. Tryptophan was determined spectrophotometrically according to the method of Beaven et al., Advances in Protein Chemistry, vol. 7, 319 (1952). The table below shows the amino acid composition of 22- and 72-hour hydrolysates. The tryptophan content, calculated from the tyrosine/tryptophan ratio, was found to be 1.0 residue per molecular weight of 6,600. It can be seen from the table that prolonged time of hydrolysis was necessary for a complete cleavage of the isoleucine bond. One molecule consists of 59 amino acids, and the molecular weight calculated on the basis of residual weights of the amino acids (Pickering et al., Biochim. and Biophys. Acta, 74, 763, 1963) was 6,589.

When pelleted in potassium bromide the peptide exhibits infrared absorption maxima at the following wave numbers: 3400 s., sh.; 3300 s., broad; 3060 m., broad; 2960 m., broad; 2930 m., broad; 2850 m., broad; 1655 s., broad; 1530 s., broad; 1450 m., broad; and 1395 m., broad.

TABLE—AMINO ACID COMPOSITION [1]

| Constituents | Composition at different times of hydrolysis | | No. of residues to nearest integer |
|---|---|---|---|
| | 22 hrs. | 72 hrs. | |
| Lysine | 5.9 | 5.8 | 6 |
| Histidine | 1.1 | 1.2 | 1 |
| Arginine | 2.8 | 3.1 | 3 |
| Ammonia | 4.0 | 5.3 | 4 |
| Aspartic acid | 2.8 | 3.1 | 3 |
| Threonine | 2.8 | 2.4 | 3 |
| Serine [2] | 3.0 | 2.7 | 3 |
| Glutamic acid | 9.9 | 10.0 | 10 |
| Proline | 4.1 | 3.6 | 4 |
| Glycine | 4.9 | 4.9 | 5 |
| Alanine | 8.0 | 8.0 | 8 |
| Valine | 1.7 | 1.7 | 2 |
| Methionine | 1.1 | 1.1 | 1 |
| Isoleucine | 0.6 | 1.1 | 1 |
| Leucine | 4.0 | 4.0 | 4 |
| Tyrosine | 2.0 | 2.0 | 2 |
| Phenylalanine | 2.0 | 1.9 | 2 |
| Tryptophan [3] | 1.0 | 1.0 | 1 |
| Total residues [4] | | | 59 |

[1] Values in molar ratios; the unit molecular weight was taken as 6,600.
[2] Values corrected for 10% loss during hydrolysis.
[3] Estimated spectrophotometrically.
[4] Ammonia was not included.

Examinations of the $NH_2$- and COOH- termini were performed by the fluorodinitrobenzene method of Sanger, Biochem. J., 39, 507 (1945) and Levy, Nature 174, 126 (1954); by Edman degradation, Fraenkel-Conrat, J. Am. Chem. Soc., 76, 3606 (1954), Edman, Acta Chem. Scand. 4, 277, 283 (1950), and Edman, Acta Chem. Biophys. Acta 41, 20 (1960); and by digestion with carboxypeptidase A and B. The results indicated the presence of glutamic acid as the only $NH_2$-terminal residue and lysine at the COOH-terminus.

Various tests for biological activity of the exclusion chromatography material were made. Melanocyte-stimulating activity was determined in vitro by the frog-skin assay of Shizume et al., Endocrinology 54, 553 (1954), and in vivo in hypophysectomized frogs, Hogben et al., Proc. Roy. Soc. (London) B108, 10 (1931). The activity was found to be $9.10^7$ units per gm. ACTH activity was determined in vitro, Saffran et al., Endocrinology, 56, 528 (1955) and Rerup, Acta Endocrin. 29, 83 (1958), and the potency was found to be about 8 units per mg. Lipolytic activity was determined in vitro with both rabbit and rat fat pads by the method of White and Engle, J. Clin. Invest. 37, 1556 (1958), as modified by Tanaka et al., Arch. Biochem. Biophys. 99, 294 (1962). The minimal effective dose was found to be 0.038 mg. in the rabbit and 0.93 mg. in the rat. A solution of 1 mg. of the exclusion chromatography material was treated by being heated with 1 ml. of 0.1 N sodium hydroxide in a boiling water bath for 10 minutes, cooled rapidly and brought to pH 3.7 with one drop of 2 N hydrochloric acid. This treatment did not have any potentiating effect on melanocyte-stimulating activity, which is in contrast to the results obtained with ACTH. On the other hand, the boiling for 10 minutes in the sodium hydroxide resulted in a 4-fold increase of the minimal effective dose on rabbit adipose tissue.

What I claim is:

1. A process of obtaining a lipolytic peptide which comprises:
    (1) extracting mammalian pituitary glands with acidified aqueous acetone and recovering the extract;
    (2) mixing the recovered extract with excess acetone to precipitate an insoluble product;
    (3) preparing an aqueous solution of the insoluble product at pH about 3.0;
    (4) adding salt to saturate the aqueous solution and form a precipitate, and recovering said precipitate;
    (5) dialyzing the precipitate in water;
    (6) recovering a dry solid from the dialyzed solution by volatilizing water therefrom in vacuo;
    (7) dissolving the recovered product in an aqueous solution of ammonium acetate of 0.01 M and pH 4.6 and chromatographing the solution on carboxymethylcellulose;
    (8) fractionally eluting absorbed material from the carboxymethylcellulose with sequential continuous linear gradients to ammonium acetate of 0.1 M, pH 6.7 and 0.2 M, pH 6.7;
    (9) recovering a dry solid from combined initial fractional eluates in the continuous linear gradient to ammonium acetate of 0.2 M and pH 6.7 by volatilizing water and ammonium acetate therefrom in vacuo;
    (10) dissolving the dry solid in an aqueous solution of ammonium acetate of 0.01 M and pH 4.6 and chromatographing the solution on carboxymethylcellulose;
    (11) fractionally eluting absorbed material from the carboxymethylcellulose with a continuous linear gradient to ammonium acetate of 0.1 M, pH 6.7; and
    (12) recovering the lipolytic peptide from combined terminal fractional eluates in the continuous linear gradient to ammonium acetate of 0.1 M and pH 6.7 by volatilizing water and ammonium acetate therefrom in vacuo.

2. The process of claim 1 which includes exclusion chromatography of the lipolytic peptide in 0.1 M acetic acid on a column of cross-linked dextran gel having a water regain value of about 5 gm. per gm.

3. A peptide from mammalian pituitary free of pituitary tissue and characterized by
    (1) its migration as a single component during disc electrophoresis in polyacrylamide gel at pH 4.5 ($\alpha$-alanine acetate buffer 0.35 M) for 30 minutes at 220 volts with a current of 12 milliamperes per tube (7 cm. x 0.5 cm.);
    (2) its migration as a single zone during zone electrophoresis on starch for 30 hours 0.1 M sodium carbonate with a potential gradient of 5 volts/cm. at 5° C.;

(3) having a partition coefficient of $K=0.33$ in a countercurrent solvent distribution system of secondary butanol/0.1% trichloroacetic acid (1:1 by volume); and (4) a sedimentation coefficient ($S_{20}W$) of 0.8 S in 0.5% solution at pH 1.3 in KCl-HCl buffer of 0.1 ionic strength;

(5) having a melanocyte-stimulating activity of about 9 times $10^7$ units per gm., an adrenocorticotropic activity of about 8 units per mg., a minimal effective lipolytic dose of about 0.3 mcg. in the rabbit and about 0.93 mcg. in the rat, and showing no potentiation of melanocyte-stimulating activity upon heating with 0.1 M sodium hydroxide;

(6) being acidic; and having by elemental analysis about 47.08 percent carbon and 7.55 percent hydrogen;

(7) a molecular weight of about 7,000;

(8) non-dialyzability through cellophane against dilute ammonium hydroxide solution;

(9) glutamic acid as the only $NH_2$ terminal residue and lysine at the COOH terminus;

(10) about 59 amino acid residues per molecule as follows: lysine, 6; histidine, 1; arginine, 3; aspartic acid, 3; threonine, 3; serine, 3; glutamic acid, 10; proline, 4; glycine, 5; alanine, 8; valine, 2; methionine, 1; isoleucine, 1; leucine, 4; tyrosine, 2; phenylalanine, 2; and tryptophan, 1; and

(11) exhibiting when pelleted in potassium bromide infrared absorption maxima at the following wave numbers: 3400 s., sh.; 330 s., broad; 3060 m., broad; 2960 m., broad; 2930 m., broad; 2850 m., broad; 1655 s., broad; 1530 s., broad; 1450 m., broad; and 1395 m., broad.

4. As a composition of matter a dry solid from mammalian pituitary consisting essentially of the peptide defined in claim 3.

References Cited

Birk et al., J. of Biological Chemistry, vol. 239, No. 4, April 1964, pp. 1048–1052.

ALBERT T. MEYERS, Primary Examiner

J. D. GOLDBERG, Assistant Examiner

U.S. Cl. X.R.

424—108, 177